Sept. 13, 1960 C. A. URANECK ET AL 2,952,043
PRODUCTION OF FILMS FROM CARBOXYLIC ACID CONTAINING
CONJUGATED DIENE POLYMER AND AN AMINE CONTAINING
CONJUGATED DIENE POLYMER
Filed Dec. 24, 1953
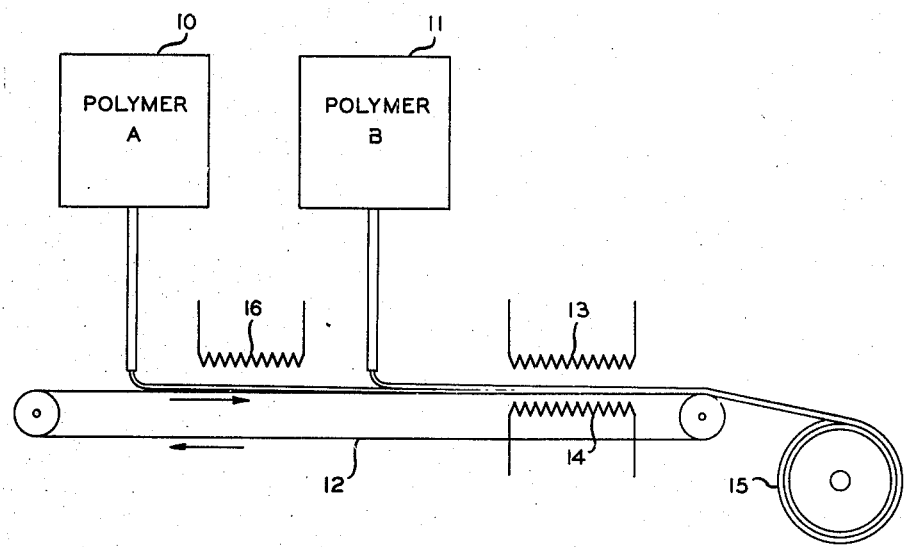
INVENTOR.
C. A. URANECK
L. A. MITCHELL
BY
ATTORNEYS

2,952,043

PRODUCTION OF FILMS FROM CARBOXYLIC ACID CONTAINING CONJUGATED DIENE POLYMER AND AN AMINE CONTAINING CONJUGATED DIENE POLYMER

Carl A. Uraneck, Phillips, and Lesher A. Mitchell, Borger, Tex., and Richard J. Sonnenfeld, Norman, Okla., assignors to Phillips Petroleum Company, a corporation of Delaware Filed Dec. 24, 1953, Ser. No. 400,393

11 Claims. (Cl. 18—57)

This invention relates to films of high tensile strength. More specifically, this invention relates to films prepared by bringing together under controlled conditions a solution of a polymeric material having a multiplicity of acidic groups with a solution of a polymeric material having a multiplicity of gasic groups. In one of its preferred embodiments, this invention relates to films of high tensile strength produced in the absence of vulcanizing agents. A still further aspect of this invention relates to a film comprising the intermolecular neutralization product of a polymer containing a multiplicity of carboxy groups and a polymer containing a multiplicity of basic nitrogen groups.

The art of polymerization is old. There are many known polymers and copolymers whose properties range from liquid to rubbery to resinous. The polymeric material may be used for casting, molding, coating, binding, etc. Films of polymeric materials are well known in the art. These films are usually prepared by vulcanization or otherwise compounding a polymeric material. This polymeric material may be a homopolymer, or copolymer; it may be acidic, basic, or neutral; or it may be a copolymer of these same types of monomers.

We have now found that when a film is prepared using a solution of a polymer containing a multiplicity of acidic groups and a solution of a polymer containing a multiplicity of basic groups, a high quality film is produced and this can be done without the use of vulcanizing agents. While our preferred embodiment does not require vulcanizing or compounding agents, the use of such agents is within the scope of this invention. One method for incorporating the compounding agent, such as a vulcanizing agent, into the film is to have said agent in the solution, however, any method of incorporating such agent known in the art is within the scope of our invention.

An object of this invention is, therefore, to produce films of high tensile strength in the absence of vulcanizing agents by a process which comprises bringing together under controlled conditions a solution of a polymeric material having a muliplicity of acidic groups with a solution of a polymeric material having a multiplicity of basic groups, removing the solvent, and drying the resulting film.

Further objects of this invention will be apparent to those skilled in the art upon reading this specification and the appended claims.

When films are produced in accordance with this invention, the two types of polymeric materials can be employed in widely varying proportions. It is not necessary that the individual polymers contain equivalent amounts of reactive groups or that the reactive components be employed in stoichiometric quantities. For example, if 50/50 copolymers are employed in each case, films can be prepared using amounts of each in the range between 1 and 99 parts by weight per 100 parts total polymeric material, preferably between 25 and 75 parts. Variations can also be introduced by using, e.g., a 50/50 copolymer in one instance and a 90/10 copolymer in the other. However, for optimum development of film strength it is usually preferable to adjust the quantities of polymeric materials so that stoichiometrically equivalent amounts of acidic and basic groups are present. A solution of each polymeric material is prepared first and these solutions are then brought together under controlled conditions to produce high tensile strength films. Numerous variations in film properties can be attained by varying the proportions of the polymers employed as well as types of polymers. For example, for some uses such as protective coatings, adhesives for metal-to-rubber bonds, cord-dipping or the like where tensile strength is of secondary importance, mixtures of solutions at other than the stoichiometric ratio might be desirable in order to obtain an excess of a certain functional group.

In the production of the films of this invention, various solvents can be employed for the polymeric materials and different methods can be used for bringing the solutions together. For the best properties the film should be homogeneous and this is particularly important if it is to have high tensile strength.

The solvents used are at least partially dependent upon the polymers to be dissolved. Inert solvents such as dioxane, benzene, xylene, and toluene are applicable. Amines such as pyridine, picolines, methylamine, dimethylamine, trimethylamine, the corresponding ethyl- and propylamines, methylethylamine, methylpropylamine, etc. are also applicable for both types of polymers. These amine-type solvents are capable of forming loose bonds or heat-labile bonds with the polymers containing acidic groups. It is preferable that the amine used be less basic than the basic monomer used in the production of the polymeric material containing basic groups. In some instances an alcohol such as ethanol or propanol can be used as a solvent for polymers containing carboxy groups, e.g., butadiene/acrylic acid copolymers. In other instances mixed solvents are employed such as benzene and an amine. It is not necessary that the same solvent be used for both types of polymers.

It is preferable that the solvents employed give proper solutions of sufficient concentration that a film of the desired thickness can be produced in one application. Polymer solutions usually range in concentration from 0.1 to 10 percent polymer by weight. The use of such solutions is well known in the art.

One method of operation which is frequently preferred involves the use of a solvent which will form a loose bond with one of the polymeric materials. As an example of this procedure, a butadiene/acrylic acid copolymer can be dissolved in an amine-type solvent such as pyridine and a butadiene/2-methyl-5-vinylpyridine copolymer can be dissolved in pyridine or a hydrocarbon solvent such as benzene. Since the pyridine reacts with the carboxy groups, solutions of the two polymers can be mixed without the formation of a precipitate. The mixture is then poured onto the surface where the film is to be deposited. As the solvent evaporates, the butadiene/2-methyl-5-vinylpyridine copolymer reacts with the butadiene/acrylic acid copolymer, replacing the pyridine which had reacted earlier. When operating in this manner, the solutions can be mixed without danger of precipitation and homogeneous films can be readily formed.

In a modification of the above procedure, the copolymers can each be dissolved in an inert solvent and sufficient amine such as pyridine added to the solution of the acidic copolymer to react with the carboxy groups. Upon evaporation of the solvent, pyridine is replaced by the polymer having basic characteristics.

A similar type of operation is concerned with dissolving each copolymer in an inert solvent and adding an organic acid such as acetic acid to the solution of the basic copolymer in sufficient quantity to react with the basic groups in the copolymer. Upon removal of the solvent, the acid-reacting copolymer will replace the acetic acid to give the film desired. In a system of this type it is sometimes desirable to dissolve the acid-reacting polymer in a dioxane or an alcohol such as ethanol or propanol rather than a hydrocarbon solvent. Various solvent mixtures can be used when operating as described above.

When inert solvents are used, a solution of each type of polymer can be prepared, the separate solutions can be mixed and poured immediately onto the surface where formation of the film is to occur. This operation must be effected in a minimum of time in order to minimize the deposition of a non-uniform film. Formation of a precipitate prior to placement of the mixture of polymer solutions onto a surface results in the production of a heterogeneous film.

An alternative procedure is to operate in two steps. In the first step one of the polymer solutions is poured onto the surface where the film is to be deposited. The solution of the other type of polymer is then introduced in such a manner that two layers are formed. Reaction of the polymeric materials occurs at the interface, as the solvent evaporates, and a uniform film results.

Referring now to the drawing which diagrammatically illustrates one specific embodiment of the invention, zone 10 contains polymer A which is a solution of a polymeric material having a multiplicity of acidic groups and zone 11 contains polymer B which is a solution of a polymeric material having a multiplicity of basic groups. A thin layer of polymer A is spread on endless belt 12. The layer of polymer A is partially dried by being exposed to the atmosphere or heat from a suitable heating means 16. A thin layer of polymer B is then spread on the partially dried layer of polymer A. The layers of polymers A and B are subjected to heat such as supplied by heaters 13 and 14 to evaporate the solvent and cause a reaction of the two polymers at the interface of the layers. A uniform film is obtained which is recovered on roller 15 for storage.

If desired, instead of forming the film from the two layers of solution, a film of one of the polymeric materials can be laid down first by any method. It can be deposited from a solution by evaporation of the solvent or can be formed into a thin sheet by any other method. A solution of the second polymeric material can then be poured over it and, as the solvent of this second solution evaporates, a reaction product is formed. When this procedure is employed, the first portion of film is usually not more than 1/16 inch in thickness and preferably 1/32 inch or less.

Other methods of bringing our two solutions together include spraying first one solution on the surface to be coated, followed by the spraying of the second solution; bringing two sheets of solution together on a moving surface; passing a film of one polymer through a solution of the other polymer; and by electrodeposition. Those skilled in the art will see other ways of bringing the two polymers together to form the film of our invention.

In the formation of a film by any of the above-described procedures, it is essential that the solvent be evaporated under conditions which will prevent the formation of bubbles. It is also desirable for most uses that the film be finally dried under conditions which will completely remove the solvent. Prevention of bubbles in the film can be markedly reduced or prevented if the initial drying or evaporation is relatively slow. It is usually effected at temperatures in the range between 10 and 40° C., preferably between 15 and 30° C. If desired, air can be passed over the surface to hasten the operation and, if conditions are properly controlled, this can be done without the harmful effect of bubble formation. The above-described procedure is used for removal of the major portion of solvent.

A higher temperature is employed for the final drying stage of the film in order to remove any solvent which remains. Vacuum drying can be used if desired. Drying temperatures are usually in the range between 60 and 150° C. The drying time will vary depending upon the solvent employed, the temperature, and the pressure, i.e., whether drying is carried out at atmospheric pressure or under vacuum. The drying time can vary from 5 minutes to 200 hours. The time and temperature of heating should be regulated so there is no deterioration in properties of the film. A film heated for extended periods, particularly at a high temperature, tends to become brittle.

The products of this invention can be used for protective coatings, sealants, adhesives, packaging materials, and in the fabrication of various shaped objects such as gloves, surgical appliances, etc. Solutions of the film-forming polymers are suitable for use in the manufacture of various types of dipped goods.

Acidic polymers which are applicable in the preparation of the polymer composition of this invention are polymers containing a multiplicity of acidic groups. These acidic polymers can be prepared by direct methods such as polymerization of monomeric materials containing acidic groups by mass, emulsion, pearl, ionic, or any other polymerization methods suitable for the monomers employed. It is also within the scope of the invention to treat a polymer under suitable conditions to convert any groups present to acidic groups or to introduce acidic groups into the polymer by any method which will yield the desired product. For example, a polymer containing —CN groups can be converted to one containing carboxy groups by hydrolysis.

The polymeric materials having a multiplicity of acidic groups which are applicable in this invention are homopolymers or heteropolymers of acid monomers. Acidic monomers, or monomers which contain at least one carboxy group per molecule, which are applicable include acrylic acid and various alpha and beta-alkyl-substituted derivatives in which the alkyl-group contains from one to eight carbon atoms such as methacrylic acid, crotonic acid, alpha and beta ethyl-, propyl-, butyl-, hexyl-, and octylacrylic acids; phenylacrylic acids, i.e., atropic and cinnamic acids; and vinylacrylic acids. Unsaturated dicarboxylic acids such as fumaric, maleic, itaconic, teraconic and citraconic acids are also applicable. Of the carboxy-containing monomers which can be employed, acrylic and methacrylic acids are most frequently preferred. Monomers containing other acidic groups are also within the scope of the invention, such as those containing sulfonic acid (—SO$_3$H), sulfuric acid (—OSO$_3$H), boric acid (—OB(OH)$_2$), phosphoric acid (—OPO—(OH)$_2$)

and phosphonic acid (—PO(OH)$_2$) groups.

Materials copolymerizable with acidic monomers include conjugated dienes, styrene, alpha-methylstyrene, various alkyl-substituted styrenes, acrylonitrile, methacrylonitrile, acrylates such as methyl acrylate, ethyl acrylate, and methyl methacrylate, vinyl chloride, vinylidene chloride, vinyl acetate, methyl vinyl ketone, methyl isopropenyl ketone, methyl vinyl ether, and the like. The preferred monomers are conjugated dienes or mixtures of conjugated dienes with each other or with other polymerizable compounds in addition to the acidic monomers. However, it is to be understood that polymers can be prepared from an acidic monomer with any neutral or acidic material or mixture of materials copolymerizable therewith. The conjugated dienes employed are preferably those which contain from four to six, inclusive, carbon atoms per molecule, but those containing more carbon atoms per molecule, e.g., eight, can also be used. These compounds include 1,3-butadiene, isoprene, piperylene, methylpentadiene, 2,3-dimethyl-1,3-butadiene, chloroprene, and others. Furthermore, various alkoxy, such as methoxy and ethoxy, and cyano derivatives of these conjugated dienes can also be employed, i.e., methoxybutadiene and cyanobutadiene.

The carboxy-containing monomer is usually employed in an amount in the range between 1 and 100 parts by weight, preferably between 10 and 50 parts by weight, per 100 parts total monomeric materials. That is we prefer a copolymer of an acidic monomer containing at least 50 percent by weight of a neutral monomer such as a conjugated diene or styrene.

The basic polymers with which this invention is concerned are homopolymers prepared from monomeric materials containing at least one basic group per molecule or copolymers of these basic materials with each other or with copolymerizable neutral monomers. These basic polymers can be prepared by direct methods such as polymerization of monomeric materials containing basic groups by mass, emulsion, pearl, ionic, or any other polymerization methods suitable for the monomers employed. It is also within the scope of the invention to treat a polymer under suitable conditions to convert any groups present to basic groups or to introduce basic groups into the polymer by any method which will yield the desired product. For example, a polymer containing —CN groups can be converted to one containing basic groups by reduction. Basic monomers, or monomers which contain at least one basic nitrogen group per molecule, which are applicable, generally are of the tertiary amine type, however, the primary and secondary amine types can be used. Of these compounds those which are most frequently preferred are pyridine and quinoline derivatives containing at least one vinylidene group. The term "vinylidene group" is a

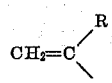

substituent where R is either hydrogen or a methyl group, i.e., the substituent is either a vinyl or an alpha-methylvinyl (isopropenyl) group. The vinylidene-substituted pyridine and quinoline compounds which are preferred are those having only one

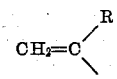

substituent and of these compounds those belonging to the pyridine series are most frequently used. Various alkyl-substituted derivatives are also applicable but it is generally preferred that the total number of carbon atoms in the nuclear-substituted alkyl groups should not be greater than 12 and most frequently these alkyl groups are methyl and/or ethyl. Examples of such compounds are 2-vinylpyridine; 3-vinylpyridine; 4-vinylpyridine; 2,4,6-trimethyl-3-vinylpyridine; 3,4,5,6-tetramethyl-2-vinylpyridine; 3-ethyl-5-vinylpyridine; 2-methyl-5-vinylpyridine; 2,6-diethyl-4-vinylpyridine; 2-isopropyl-4-nonyl-5-vinylpyridine; 2-methyl-3-undecyl-4-vinylpyridine; 3-dodecyl-2,4-divinylpyridine; 2,4-dimethyl-5,6-diphenyl-3-vinylpyridine; 3,5-di(alpha-methylvinyl) pyridine; similar mono and di substituted alkene, alkadiene and alkyne pyridines; and like quinolines. Other polymerizable compounds which contain basic nitrogen groups and which are also considered applicable include dialkylaminostyrenes such as dimethylaminostyrene, diethylaminostyrene, methylethylaminostyrene, dipropylaminostyrene, methylpropylaminostyrene, and the corresponding dialkylamino-alpha-methylstyrenes; dialkylaminoethyl acrylates such as dimethylaminoethyl acrylate, diethylaminoethyl acrylate, dipropylaminoethyl acrylate, methylethylaminoethyl acrylate, etc., and the corresponding dialkylaminoethyl methacrylates, e.g., dimethylaminoethyl methacrylate, diethylaminoethyl methacrylate, and the like. In general the alkyl groups will be on the amine but one or both can be on the styrene. Other basic polymers which are applicable to our invention include homopolymers or copolymers (as defined above) of vinylpyrrole, vinylmorpholine, alkenylamines, vinylpyrazine, vinylpyridazine and vinylpiperazine, as well as other vinyl heterocyclic nitrogen containing compounds.

The neutral materials copolymerizable with basic monomers are the same as those hereinbefore given as being copolymerizable with acidic monomers. Of these materials, conjugated dienes or mixtures of conjugated dienes with each other or with other polymerizable compounds are preferred.

The polymerizable compound containing basic nitrogen groups is employed in an amount in the range between 1 and 100 parts by weight, preferably between 10 and 50 parts by weight, per 100 parts total monomeric material.

As has been indicated, we prefer that both our acidic and our basic polymer contain at least 50 percent of a conjugated diene such as butadiene. Polymeric materials can vary from liquid to rubbery to resinous. The conjugated dienes are well known monomers for producing rubbery polymers. We have found that film produced by our method using copolymers, each containing at least 50 percent of a conjugated diene, are tough and pliable. Such a material can be used for many purposes, for example, in the manufacture of pliable film, coating cord, cloth, and other materials. By selecting the proper method, such as spraying, dipping, electrodeposition, etc., the film of our invention can be advantageously employed wherever a tough pliable film is desired. On the other hand, a more rigid film can be produced by using less or no conjugated diene. Such a rigid material would be desirable in covering metal tile and the like.

Both types of polymeric materials can be prepared by any methods known to the art, such as mass or emulsion polymerization.

The advantages of our invention can best be described by way of the following examples which are given for the purpose of illustration only and they are not intended to limit the scope of our invention in any manner. For example, any of the polymers or copolymers containing a multiplicity of acid groups and any of the polymers or copolymers containing a multiplicity of basic groups as disclosed may be used in place of the polymers used to illustrate these examples. The particular polymers used give rubbery films which are superior in many ways, as shown by the examples, to films prepared by conventional methods.

Example I

A butadiene/acrylic acid copolymer was prepared by emulsion polymerization at 5° C. in accordance with the following recipe:

| | Parts by weight |
|---|---|
| Butadiene | 25 |
| Acrylic acid | 25 |
| Water | 180 |
| Duponol ME [1] | 4 |
| Tert-dodecyl mercaptan | 0.5 |
| Tert-butylisopropylbenzene hydroperoxide | 0.115 |
| Benzene | 50 |
| $FeSO_4 \cdot 7H_2O$ | 0.139 |
| $K_4P_2O_7$ | 0.165 |
| KCl | 0.1 |

[1] Sodium lauryl sulfate.

A conversion of 75 percent was reached in 24 hours.
Butadiene was copolymerized with 2-methyl-5-vinylpyridine (MVP) in an emulsion polymerization system at 5° C. in accordance with the recipe given below. Three runs were made using different amounts of mercaptan.

|  | Parts by weight |
|---|---|
| Butadiene | 50 |
| 2-methyl-5-vinylpyridine | 50 |
| Water | 200 |
| Fatty acid soap [1] | 5 |
| Mercaptan blend [2] | 0.15, 0.20, 0.25 |
| Cumene hydroperoxide | 0.05 |
| $FeSO_4.7H_2O$ | 0.084 |
| $K_4P_2O_7$ | 0.10 |
| KCl | 0.30 |

[1] Potassium Office Rubber Reserve soap.
[2] A blend of tertiary $C_{12}$, $C_{14}$, and $C_{16}$ aliphatic mercaptans in a ratio of 3:1:1 parts by weight.

Results of the three runs were as follows:

| Mercaptan Blend, Parts | Reaction Time, hours | Conversion, percent | Mooney Value, ML-4 |
|---|---|---|---|
| 0.15 | 8.3 | 71 | 94 |
| 0.20 | 10.3 | 72 | 61 |
| 0.25 | 8.7 | 73 | 45 |

A blend of the three butadiene/2-methyl-5-vinylpyridine copolymers was prepared and the resulting material dissolved in benzene to make a solution containing 5.5 percent polymer by weight. The butadiene/acrylic acid copolymer was dissolved in dioxane to make a solution containing 4.9 percent polymer by weight.

Three different methods were employed for bringing the polymer solutions together to form films. In each case the quantities of solutions were regulated so that equivalent amounts of acrylic acid and 2-methyl-5-vinylpyridine were present. The methods used were:

(1) The solutions were mixed and then poured into a shallow container for evaporation of the solvents and formation of the film.

(2) The solution of the butadiene/acrylic acid copolymer was poured into a shallow container and the solution of the butadiene/2-methyl-5-vinylpyridine copolymer was added in such a manner that two layers were formed.

(3) The solution of the butadiene/acrylic acid copolymer was poured into a shallow container and allowed to evaporate to a semi-dry film before the solution of the butadiene/2-methyl-5-vinylpyridine copolymer was poured onto it.

For control purposes, separate solutions of the individual copolymers were poured into shallow containers.

All solutions or mixtures were allowed to dry undisturbed for 70 hours at room temperature (approximately 20–25° C.) and then for 48 hours in a draft oven at 60° C. The dried films were stripped from the containers and samples cut in the regular dumbbell shape for tensile strength tests. Results of tensile strength and elongation tests are shown below:

| Film | Film Thickness, inch | Tensile, p.s.i. | Elongation, percent |
|---|---|---|---|
| From Method (1) | 0.011 | 350 | 150 |
| From Method (2) | 0.008 | 2,100 | 400 |
| From Method (3) | 0.007–0.008 | 1,000 | 450 |
| Butadiene/acrylic acid control | 0.006–0.007 | 160 | 600 |
| Butadiene/2-methyl-5-vinylpyridine control | 0.008–0.009 | 0 |  |

Example II

Butadiene/acrylic acid and butadiene/2-methyl-5-vinylpyridine copolymers were prepared and dissolved in dioxane and benzene, respectively, as described in Example I. Films were prepared by introducing equivalent amounts of each of the solutions into 5.75-inch petri dishes without allowing the solutions to mix (method (2) of Example I). All petri dishes had been coated with carboxymethylcellulose by evaporating 10 ml. of 0.1 percent solution. This treatment was to facilitate removal of the dry films from the dishes. The films were allowed to dry undisturbed for 22 hours, two of them at room temperature (20–25° C.) and the other for 24 hours in a 60° C. draft oven. They were then heated in a draft oven at 60° C., two of them for 24 hours and the other for 120 hours. Measurements of tensile strength and elongation were then made. The films were each heated in the 60° C. oven for an additional 96 hours, after which tensile strength and elongation tests were again made. The following results were obtained:

|  | Runs | | |
|---|---|---|---|
|  | 1 | 2 | 3 |
| Temperature of initial evaporation, ° C | 20–25 | 20–25 | 60 |
| Time in oven at 60° C., hours | 24 | 120 | [1] 24 |
| Average thickness of test strip, inches | 0.0115 | 0.012 | 0.014 |
| Tensile, p.s.i | 350 | 1,050 | 780 |
| Elongation, percent | 410 | 370 | 370 |
| Additional heating at 60° C., hours | 96 | 96 | 96 |
| Total time in oven at 60° C., hours | 120 | 216 | [1] 120 |
| Average thickness of test strip, inches | 0.0145 | 0.014 | 0.0125 |
| Tensile, p.s.i | 840 | 1,600 | 1,100 |
| Elongation, percent | 290 | 400 | 300 |

[1] Does not include original 24 hours evaporation and drying at 60° C. The films appeared to be uniform.

Example III

A butadiene/acrylic acid copolymer was prepared as follows:

|  | Parts by weight |
|---|---|
| Butadiene/acrylic acid | 50/50. |
| Water | 315. |
| Duponol ME [1] | 8.0. |
| Tert-$C_{12}$ mercaptan | 1.0 |
| Tert-butylisopropylbenzene hydroperoxide | 0.115. |
| $KCl/FeSO_4.7H_2O/K_4P_2O_7$ | 0.1/0.14/0.165. |
| Temperature (° F.) | 41. |
| Time (hrs.) | 27.3. |
| Conversion (percent) | 84. |
| Shortstop | Di-tert-butylhydroquinone. |
| ML-4 (Mooney value) | 24. |
| Acrylic acid in polymer (percent) | 35.2. |
| Coagulated | Salt-alcohol. |

[1] As in Example I.

The butadiene/acrylic acid copolymer was dissolved in dioxane as shown in Example I. A benzene solution of butadiene/vinylpyridine copolymer was prepared as shown in Example I.

Films were prepared by adding equivalent amounts of each copolymer solution to each of several 5.75-inch petri dishes in such a way that no mixing of the solutions occurred (method (2) of Example I) and allowing the solutions to dry undisturbed overnight at room temperature. All but two of the petri dishes had been coated with carboxymethylcellulose as previously described in order to facilitate removal of the films. Tensile and elongation data were determined on standard dumbbell-shaped samples after 24 and 120 hours of heating. Four of the films were heated at 60° C. and four at 100° C. The films heated 120 hours at 60° C. were also heated at 80° C. under vacuum for 15.5 hours' additional time, after which tensile strength and elongation tests were again made. Data are given in the following table:

| Run No. | Time in Oven, Total Hours at— | | | Average Film Thickness, inches | Tensile, p.s.i. | Elongation, percent |
|---|---|---|---|---|---|---|
| | 60° C. | 80° C. | 100° C. | | | |
| 1 | 24 | | | 0.010 | 640 | 430 |
| 2 | 24 | | | 0.0115 | 400 | 420 |
| 3 | 24 | | | 0.0095 | 560 | 420 |
| 4 | [1] 24 | | | 0.013 | 660 | 440 |
| 5 | | | 24 | 0.010 | 1,280 | 390 |
| 6 | | | 24 | 0.013 | 1,000 | 500 |
| 7 | | | 24 | 0.012 | 1,350 | 490 |
| 8 | | | [1] 24 | 0.0105 | 1,240 | 370 |
| 1 | 120 | | | 0.014 | 560 | 420 |
| 2 | 120 | | | 0.011 | 750 | 430 |
| 3 | 120 | | | 0.0115 | 640 | 380 |
| 4 | [1] 120 | | | 0.012 | 840 | 410 |
| 5 | | | 120 | 0.012 | 1,180 | 0 |
| 6 | | | 120 | 0.0115 | 2,550 | 0 |
| 7 | | | 120 | 0.013 | [2] 1,400 | 0 |
| 8 | | | [1] 120 | 0.0115 | [2] 1,160 | 0 |
| 1 | 120 | 15.5 | | 0.014 | 600 | 470 |
| 2 | 120 | 15.5 | | 0.010 | 800 | 500 |
| 3 | 120 | 15.5 | | 0.0145 | 720 | 500 |
| 4 | [1] 120 | 15.5 | | 0.011 | 680 | 510 |

[1] Petri dish not treated with carboxymethylcellulose.
[2] Dumbbell tore across clamping section instead of breaking through the measured test strip.

The films prepared by heating at 100° C. for 120 hours were dark, very strong under tension, but had very little if any elasticity. Films prepared by heating at 60° C. were yellow to light brown in color. All of the films were uniform.

*Example IV*

A series of butadiene/acrylic acid copolymers having different Mooney values (ML-4) was prepared by emulsion polymerization at 5° C. in accordance with the following recipe:

| | Parts by weight |
|---|---|
| Butadiene | 50 |
| Acrylic acid | 50 |
| Benzene | 100 |
| Water | 315 |
| Duponol ME [1] | 8 |
| Tert-dodecyl mercaptan | variable |
| Tert-butylisopropylbenzene hydroperoxide | 0.229 |
| KCl | 0.1 |
| $FeSO_4.7H_2O$ | 0.278 |
| $K_4P_2O_7$ | 0.330 |

[1] As in Example I.

The following results were obtained:

| Run | tert-$C_{12}$ Mercaptan, parts | Conversion, percent | | Mooney Value, ML-4 |
|---|---|---|---|---|
| | | 4 hours | 22 hours | |
| 1 | 0.5 | | 72 | ([1]) |
| 2 | 0.8 | | 76 | 54.7 |
| 3 | 1.2 | | 58 | 18 |
| 4 | 1.5 | 73 | | 23.6 |

[1] Too high to measure.

During the polymerization 0.11 part tert-butylisopropylbenzene hydroperoxide was added to each of the first three runs after 5.5 hours. At 21 hours 0.5 millimole activator (0.139 part $FeSO_4.7H_2O$ and 0.165 part $K_4P_2O_7$) was added in each case.

A series of butadiene/2-methyl-5-vinylpyridine copolymers having different Mooney values (ML-4) was prepared by emulsion polymerization at 5° C. in accordance with the following recipe:

| | Parts by weight |
|---|---|
| Butadiene | 50 |
| 2-methyl-5-vinylpyridine | 50 |
| Water | 200 |
| Fatty acid soap [1] | 5 |
| Mercaptan blend [1] | variable |
| Cumene hydroperoxide | 0.05 |
| $FeSO_4.7H_2O$ | 0.084 |
| $K_4P_2O_7$ | 0.10 |
| KCl | 0.30 |

[1] As in Example I.

The following results were obtained:

| Run | Mercaptan Blend, parts | Polymerization Time, hours | Conversion, percent | Mooney Value, ML-4 |
|---|---|---|---|---|
| 1a | 0.10 | 6.9 | 74 | |
| 2a | 0.15 | 6.9 | 71 | 101 |
| 3a | 0.20 | 7.7 | 73 | 79 |
| 4a | 0.25 | 7.7 | 75 | 47 |
| 5a | 0.35 | 7.6 | 74 | 30 |
| 6a | 0.50 | 7.7 | 74 | 16 |

Solutions of the butadiene/acrylic acid copolymers in dioxane and the butadiene/2-methyl-5-vinylpyridine copolymers in benzene were prepared as previously described. Films were prepared from combinations of these solutions by introducing the butadiene/acrylic acid solution into a shallow container and then adding the solution of the butadiene/2-methyl-5-vinylpyridine copolymer in such a way that two layers were formed. Quantities of solutions were adjusted to give equimolar amounts of acrylic acid and 2-methyl-5-vinylpyridine in the film. The solvent was allowed to evaporate at 20-25° C. for approximately 16 hours (overnight). Drying was continued at 60° C. in a draft oven for 148 hours, after which the tensile strength and elongation were determined for each uniform film. Tensile strength and elongation measurements were again made after the films were dried for an additional 21 hours at 105° C. Results are shown in the following table:

| Acrylic Acid Copolymer | | 2-Methyl-5-Vinyl-pyridine Copolymer | | After 148 Hours at 60° C. | | After 21 Additional Hours at 105° C. | |
|---|---|---|---|---|---|---|---|
| Run Number | ML-4 | Run Number | ML-4 | Tensile, p.s.i. | Elongation, percent | Tensile, p.s.i. | Elongation, percent |
| 1 | | 1a | | 1,950 | 330 | 2,160 | 10 |
| 1 | | 2a | 101 | 1,280 | 230 | 1,700 | 0 |
| 1 | | 3a | 79 | 1,480 | 270 | 1,120 | 0 |
| 2 | 54.7 | 4a | 47 | 1,900 | 60 | 1,880 | 0 |
| 4 | 23.6 | 5a | 30 | 1,700 | 70 | 1,800 | 10 |
| 3 | 18 | 6a | 16 | 2,200 | 250 | 2,450 | 0 |

*Example V*

Three films were prepared from pyridine solutions of 50/50 copolymers, one from a butadiene/acrylic acid copolymer, one from a butadiene/2-methyl-5-vinylpyridine copolymer, and one from a mixture of the two copolymers in such proportions to give equivalent amounts of acrylic acid and 2-methyl-5-vinylpyridine in the film. No precipitation occurred when the solutions of the two copolymers were mixed. Pyridine was allowed to evaporate from the solutions, which had been placed in shallow containers, for 123 hours at a temperature of 20-25° C. The films were then placed in a draft oven at 60° C. for 41 hours after which the tensile strength and elongation were determined. The films were again heated at 60° C. this time for 48 hours, or a total heating time of 89 hours, and tests again made. The procedure was repeated with the third heating period being 72 hours, or a total time of 161 hours. All of the films produced by this method appeared to be homogeneous. The following results were obtained.

| Film From | Tensile, p.s.i., After Heating at 60° C. For— | | | Elongation, Percent After Heating at 60° C. For— | | |
|---|---|---|---|---|---|---|
| | 41 | 89 | 161 | 41 | 89 | 161 |
| | Hours | Hours | Hours | Hours | Hours | Hours |
| Mixture of copolymers | 3,200 | 3,200 | 2,520 | 460 | 330 | 240 |
| Butadiene/acrylic acid | 200 | 1,120 | 1,260 | 610 | 560 | 530 |
| Butadiene/2-methyl-5-vinylpyridine | 0 | 0 | 0 | 640 | 690 | 280 |

In describing our invention, we have used butadiene/acrylic acid copolymer as our acidic polymer and butadiene/2-methyl-5-vinylpyridine as our basic polymer. Those skilled in the art will recognize that many modifications can be made in our process without departing from the scope thereof. For example, any of the acidic and basic polymers as have been indicated are applicable in our invention.

We claim:

1. A process for producing a polymeric film which comprises bringing together in separate thin layers (A) 1 to 99 parts by weight, based on total weight of polymeric materials, of a first polymeric material prepared by copolymerizing a carboxylic acid containing a polymerizable ethylenic unsaturation with 10–90 weight percent of a conjugated diene of 4 to 8 carbon atoms, said first polymeric material being in solution in an inert solvent, and (B) 99 to 1 weight parts of a second polymeric material prepared by copolymerizing an amine containing a vinylidene group attached to a carbon atom with 10–90 weight percent of a conjugated diene of 4 to 8 carbon atoms, said amine being selected from the group consisting of primary, secondary and tertiary amines, said second polymeric material being in solution in a solvent and evaporating the solvents thereby effecting the formation of said film.

2. The process of claim 1 wherein one of said layers is first formed and at least partially dried followed by applying the remaining layer to the thus dried first layer.

3. The process of claim 2 wherein the carboxylic acid is selected from the group consisting of alpha and beta alkyl derivatives of acrylic acid wherein the alkyl substituents contain 1 to 8 carbon atoms and the amine is selected from the group consisting of hydrocarbon pyridines and quinolines wherein at least one substituent is a vinylidene group and wherein the total number of carbon atoms in substituent groups does not exceed 12.

4. The process of claim 2 wherein the carboxylic acid is acrylic acid and the amine is 2-methyl-5-vinylpyridine.

5. The process of claim 2 wherein the polymeric material prepared from carboxylic acid is a copolymer of butadiene and methacrylic acid.

6. The process of claim 8 wherein the polymeric material prepared from carboxylic acid is a copolymer of butadiene and methacrylic acid.

7. The process of claim 2 wherein the polymeric material prepared from an amine is a copolymer of butadiene and 2-methyl-5-vinylpyridine.

8. A process for producing a polymeric film which comprises bringing together in separate thin layers (A) 1 to 99 parts by weight, based on total weight of polymeric materials, of a first polymeric material prepared by copolymerizing a carboxylic acid containing a polymerizable ethylenic unsaturation with 10–90 weight percent of a conjugated diene of 4 to 8 carbon atoms, said first polymeric material being in solution in an inert solvent, and (B) 99 to 1 weight parts of a second polymeric material prepared by copolymerizing an amine containing a vinylidene group, attached to a carbon atom with 10–90 weight percent of a conjugated diene of 4 to 8 carbon atoms, said amine being selected from the group consisting of primary, secondary and tertiary amines, said second polymeric material being in a solution comprising an organic acid, and evaporating the solvents thereby effecting the formation of said film.

9. The process of claim 8 wherein one of said layers is first formed and at least partially dried followed by applying the remaining layer to the thus dried first layer.

10. The process of claim 9 wherein the organic acid is acetic acid.

11. The process of claim 10 wherein the carboxylic acid is selected from the group consisting of alpha and beta alkyl derivatives of acrylic acid wherein the alkyl substituents contain 1 to 8 carbon atoms and the amine is selected from the group consisting of hydrocarbon substituted pyridines and quinolines wherein at least one substituent is a vinylidene group and wherein the total number of carbon atoms in substituent groups does not exceed 12.

References Cited in the file of this patent

UNITED STATES PATENTS

| 2,326,899 | Thinius | Aug. 17, 1943 |
| 2,527,863 | Webb | Oct. 31, 1950 |
| 2,561,215 | Mighton | July 17, 1951 |
| 2,586,770 | Alm | Feb. 26, 1952 |
| 2,586,883 | Stroh | Feb. 26, 1952 |
| 2,592,107 | Azorlosa | Apr. 8, 1952 |
| 2,593,414 | Crouch | Apr. 22, 1952 |
| 2,647,094 | Hahn | July 28, 1953 |
| 2,807,597 | Sonnenfeld et al. | Sept. 24, 1957 |

OTHER REFERENCES

Schmidt and Marlies: "Principles of High Polymer Theory and Practice," page 350, sec. 848, copyright 1948 by McGraw-Hill Co., Inc., N.Y.